(12) United States Patent
Kim et al.

(10) Patent No.: US 8,325,311 B2
(45) Date of Patent: Dec. 4, 2012

(54) LIQUID CRYSTAL DISPLAY DEVICE AND METHOD OF FABRICATING THE SAME

(75) Inventors: Ka-Kyung Kim, Seoul (KR); Seong-Soo Hwang, Gyeongsangbuk-do (KR); Young-Sik Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 326 days.

(21) Appl. No.: 12/318,268

(22) Filed: Dec. 23, 2008

(65) Prior Publication Data

US 2010/0002180 A1    Jan. 7, 2010

(30) Foreign Application Priority Data

Jul. 7, 2008  (KR) .......................... 10-2008-0065600
Sep. 29, 2008  (KR) .......................... 10-2008-0095303

(51) Int. Cl.
  *G02F 1/1339*  (2006.01)
  *G02F 1/1343*  (2006.01)

(52) U.S. Cl. ....................................... 349/153; 349/139

(58) Field of Classification Search .................. 349/149, 349/153, 139
See application file for complete search history.

(56) References Cited

U.S. PATENT DOCUMENTS

| | | | |
|---|---|---|---|
| 6,888,606 B2 * | 5/2005 | Hinata et al. .................. | 349/149 |
| 7,019,718 B2 * | 3/2006 | Yamazaki et al. .............. | 345/80 |
| 2007/0030409 A1 * | 2/2007 | Aoki ............................... | 349/56 |

* cited by examiner

*Primary Examiner* — Nathanael R Briggs
(74) *Attorney, Agent, or Firm* — Morgan, Lewis & Bockius LLP (57) ABSTRACT

A liquid crystal display device includes: first and second substrates facing and spaced apart from each other, the first and second substrates having; first to fourth driving lines in the non-display area over the first substrate, the first and second driving lines horizontally separated by a first distance, and the third and fourth driving lines horizontally separated by a second distance greater than the first distance; a seal pattern of an ultraviolet curable material in the non-display area, the seal pattern overlapping the third and fourth driving lines; and a liquid crystal layer inside the seal pattern between the first and second substrates.

15 Claims, 11 Drawing Sheets

LIQUID CRYSTAL DISPLAY DEVICE AND METHOD OF FABRICATING THE SAME

This application claims the benefit of Korean Patent Application No. 10-2008-0065600 filed on Jul. 7, 2008 and No. 10-2008-0095303 filed on Sep. 29, 2008, which are hereby incorporated by reference in its entirety.

TECHNICAL FIELD

The present application relates to a liquid crystal display device, and more particularly, to a liquid crystal display device where a seal pattern is stably cured and a method of fabricating the liquid crystal display device.

BACKGROUND

As information age progresses, flat panel display (FPD) devices having the characteristics of light weight, thin profile, and low power consumption have been required. The FPD devices are classified according to self-emission ability: an emissive type where a display element itself emits light and a non-emissive type where the FPD device includes an external light source. The emissive type FPD devices include plasma display panel (PDP) devices, field emission display (FED) devices and electroluminescent display (ELD) devices, while the non-emissive type FPD devices include liquid crystal display (LCD) devices. Among various FPD devices, LCD devices have been widely used for a notebook computer, a monitor and a television because of their superiority in resolution, color display and display quality.

An LCD device includes two substrates spaced apart and facing each other and a liquid crystal layer interposed between the two substrates. Each of the two substrates includes an electrode on a surface facing the other of the two substrates. A voltage is applied to each electrode to induce an electric field between the electrodes and the alignment of the liquid crystal molecules as well as the transmittance of light through the liquid crystal layer is controlled by varying the intensity of the electric field, thereby the LCD device displaying images.

A fabrication process for an LCD device includes a process of forming a first substrate, which may be referred to as an array substrate, having a thin film transistor (TFT) as a switching element and a pixel electrode in each pixel region, a process of forming a second substrate, which may be referred to as a color filter substrate, having a color filter layer and a common electrode facing the pixel electrode and a process of attaching the first and second substrates and forming a liquid crystal layer between the first and second substrates to form liquid crystal panels, i.e., liquid crystal cells.

The process of forming the liquid crystal panels is referred to as a liquid crystal cell process. The liquid crystal cell process includes a step for forming alignment layers on the first and second substrates, a step for attaching the first and second substrates to form a cell gap therebetween, a step for cutting the attached first and second substrates into the liquid crystal panels and a step for forming the liquid crystal layer in each liquid crystal panel. For example, after a seal pattern is formed at a boundary region, the first and second substrates are attached and the attached first and second substrates are cut into the liquid crystal panels. Next, a liquid crystal material is injected into each liquid crystal panel using a capillary phenomenon under a vacuum condition. This injection method of the liquid crystal material requires a process time over 10 hours.

To reduce the process time for forming the liquid crystal panel, a sequential dispensing and attaching method where a liquid crystal material is dispended on one of the first and second substrates and the first and second substrates are sequentially attached and an apparatus for the sequential dispensing and attaching method have been suggested. For example, after a seal pattern of an ultraviolet (UV) curable material is formed on a first substrate, a liquid crystal material is dispensed on the one of the first substrate in the seal pattern. Next, a second substrate is aligned with and attached to the first substrate, and the seal pattern is cured with a UV ray. Next, the attached first and second substrates are cut into liquid crystal panels. In a sequential dispensing and attaching method, since the liquid crystal material is dispensed without using a capillary phenomenon, the process time for forming the liquid crystal panels is reduced. In addition, since the liquid crystal material is dispensed from an upper portion of the seal pattern, the seal pattern has a closed rectangular ring shape without an injection hole.

Figure 1:
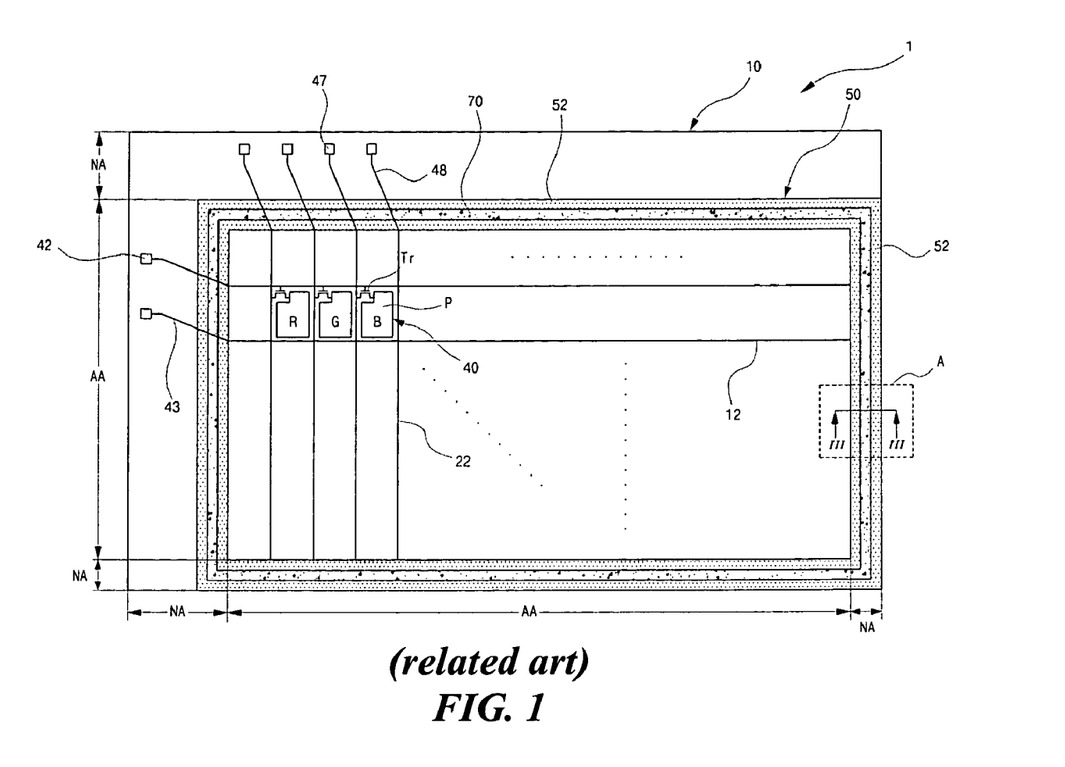
FIG. 1 is a plan view showing a liquid crystal panel for a liquid crystal display device according to the related art.
Figure 2:
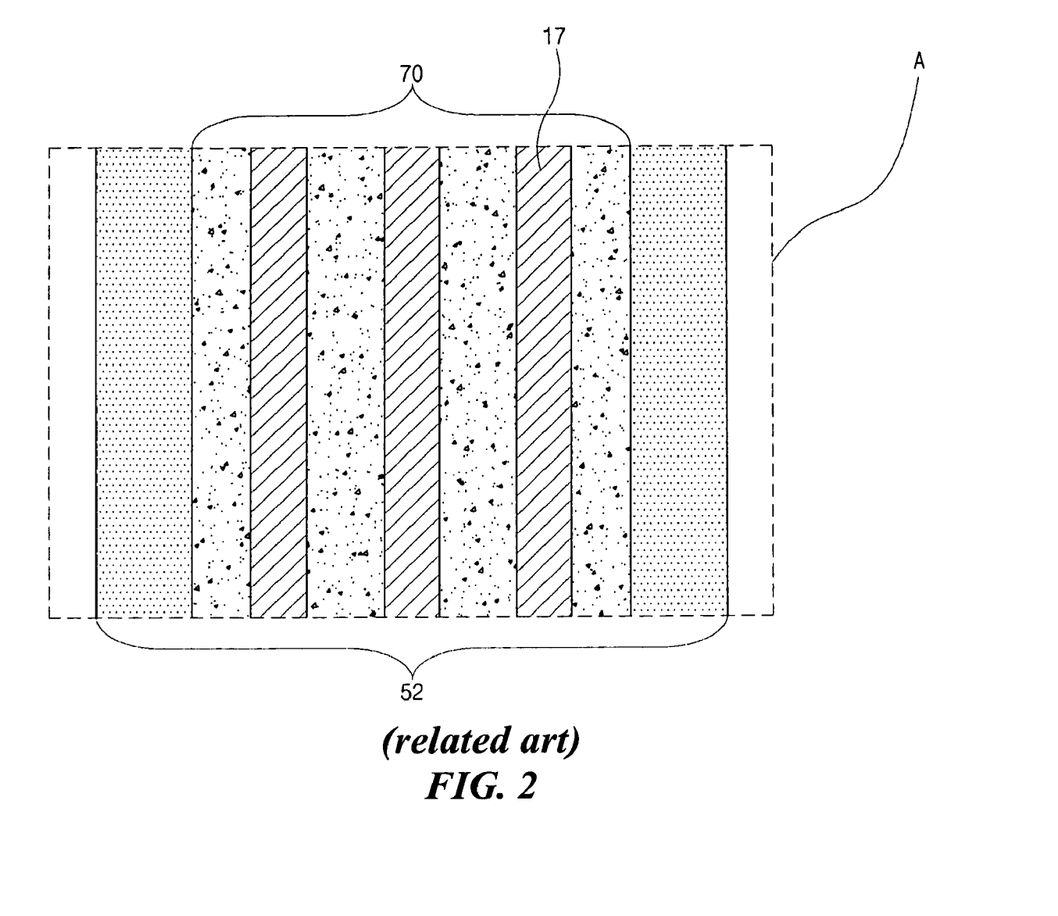
FIG. 2 is a magnified view of a portion A of FIG. 1.
Figure 3:
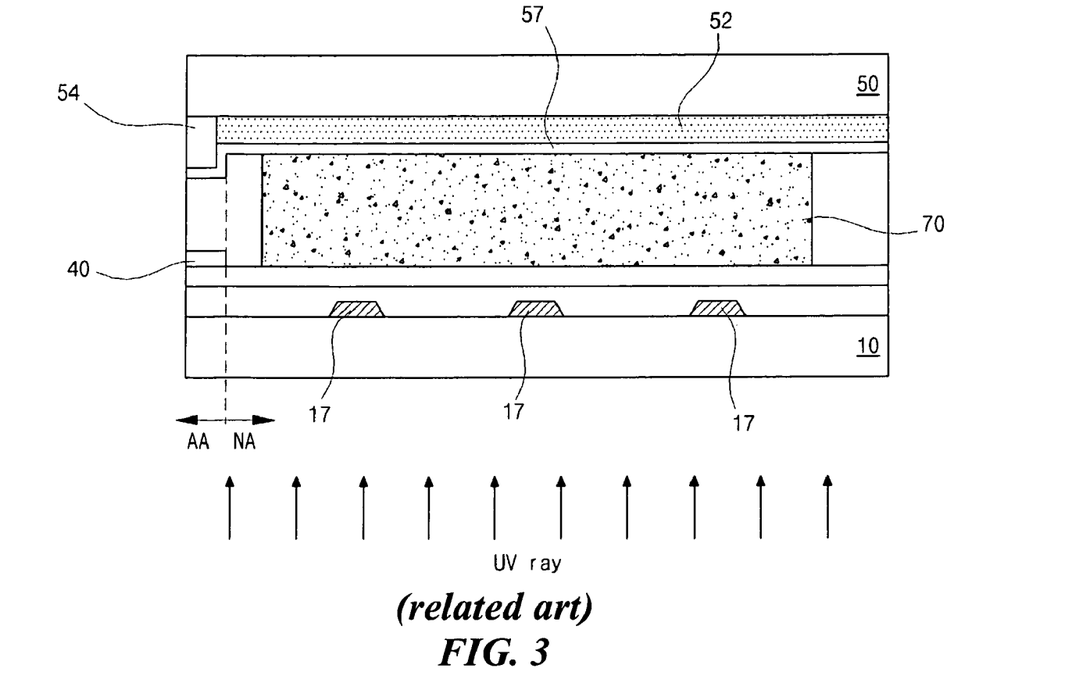
FIG. 3 is a cross-sectional view taken along a line III-III of FIG. 2.

FIG. 1 is a plan view showing a liquid crystal panel for a liquid crystal display device according to the related art, FIG. 2 is a magnified view of a portion A of FIG. 1, and FIG. 3 is a cross-sectional view taken along a line III-III of FIG. 2. In FIGS. 1, 2 and 3, a liquid crystal panel 1 includes a display area AA and a non-display area NA surrounding the display area AA. A plurality of gate pads 42, a plurality of data pads 47, a plurality of gate link lines 43 and a plurality of data link lines 48 are formed in the non-display area NA on a first substrate 10 of the liquid crystal panel 1. The plurality of gate link lines 43 are connected to the plurality of gate pads 42, and the plurality of data link lines 48 are connected to the plurality of data pads 47. A plurality of gate lines 12, a plurality of data lines 22, a plurality of thin film transistors (TFTs) Tr and a plurality of pixel electrodes 40 are formed in the display area AA on the first substrate 10 of the liquid crystal panel 1. The plurality of gate lines 12 are connected to the plurality of gate link lines 43, and the plurality of data lines 22 are connected to the plurality of data link lines 48. The plurality of gate lines 12 and the plurality of data lines 22 cross each other to define a plurality of pixel regions P. In addition, the TFT Tr is connected to the gate line 12 and the data line 22, and the pixel electrode 49 is connected to the TFT Tr in each pixel region P.

A second substrate 50 of the liquid crystal panel 1 faces and is spaced apart from the first substrate 10. A color filter layer 54, a black matrix 52 and a common electrode 57 are formed on an inner surface of the second substrate 10. The color filter layer 54 includes red, green and blue color filters R, G and B each corresponding to the pixel region P. In addition, the black matrix 52 corresponds to the gate line 12, the data line 22 and the non-display area NA, and the common electrode 57 is formed on the entire second substrate having the color filter layer 54 and the black matrix 52. Further, a liquid crystal layer (not shown) is formed between the first and second substrates 10 and 50, and a seal pattern 70 of a UV curable material is formed in the non-display area NA between the first and second substrates 10 and 50.

A plurality of driving lines 17 for driving the liquid crystal panel 1 are formed on the first substrate 10 in the non-display area NA. The plurality of driving lines 17 may be disposed between the plurality of gate pads 42 and the display area AA and between the plurality of data pads 47 and the display area AA. For example, a common voltage applied to the common electrode 57 or a gate low voltage applied to the gate line 12 for turning off the TFT Tr may be transmitted from an external circuit unit (not show) through the plurality of driving lines 17. The seal pattern 70 covers the plurality of driving lines 17 and the black matrix 52 covers the seal pattern 70 and the plurality of driving lines 17. After the first and second substrates 10 and 50 are attached, the seal pattern 70 of a UV curable material is cured with a UV ray. Since the black matrix 52 on the second substrate 50 blocks the seal pattern 70 completely, the UV ray is irradiated onto the seal pattern 70 from a UV source under the first substrate 10 through the plurality of driving lines 17. When an area proportion of the plurality of driving lines 17 is smaller than about 50%, the seal pattern 70 can be cured uniformly by the UV ray through the plurality of driving lines 17. Accordingly, the plurality of driving lines 17 are formed to be spaced apart from each other by a width equal to or greater than a width of each driving line 17.

After the liquid crystal panel 1 is formed, a backlight unit is disposed under the liquid crystal panel 1 and a driving unit is connected to the liquid crystal panel 1 and the backlight unit, thereby an LCD device completed. The driving unit may include a printed circuit board (PCB) and may be divided into a gate driving unit and a data driving unit. The gate driving unit and the data driving unit may be connected to the gate pad 42 in one side portion and the data pad 47 in another side portion, respectively, of the liquid crystal panel 1 through one of a tape carrier package (TCP) and a flexible printed circuit (FPC).

Recently, an LCD device has been applied to portable electronic devices such as a cellular phone and a personal digital assistant (PDA) as well as a television and a monitor. Since the LCD device applied to the portable electronic devices has a relatively small size, the LCD device is required to have a smaller non-display area for a larger display area. Accordingly, a width between adjacent driving lines is reduced and a seal pattern may not be cured uniformly. Further, to reduce a non-display area, a plurality of gate pads and a plurality of data pads may be formed on a single side portion of a liquid crystal panel and a driving unit may be connected to the gate pads and the data pads at the single side portions. Since a plurality of gate link lines for a gate high voltage applied to a gate line for turning on a TFT are also included in the driving lines, the number of the driving lines increases. As a result, a sufficient width for a uniform cure of the seal pattern is not obtained.

Figure 4:
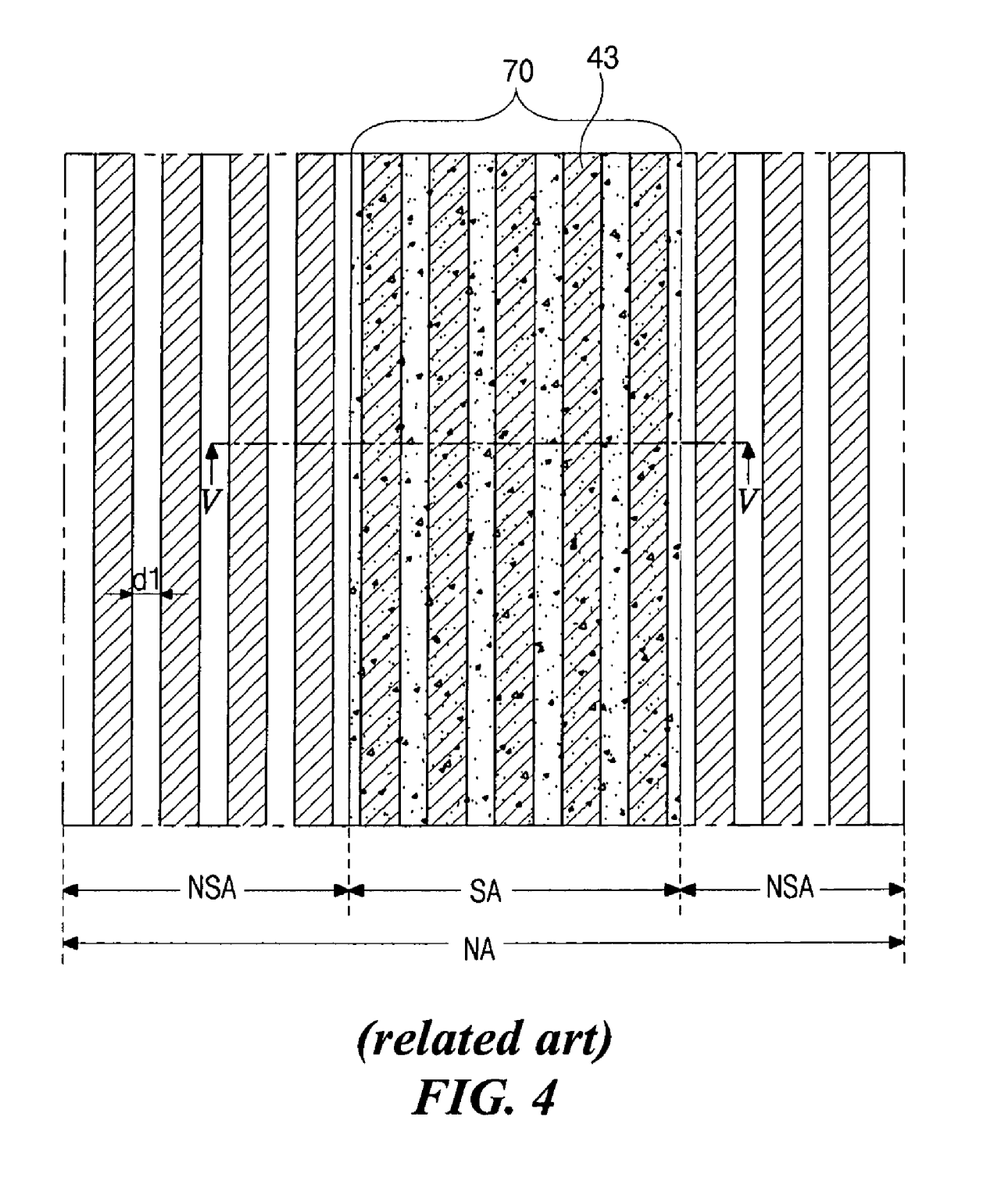
FIG. 4 is a plan view showing a non-display area of a small-sized liquid crystal panel according to the related art.
Figure 5:
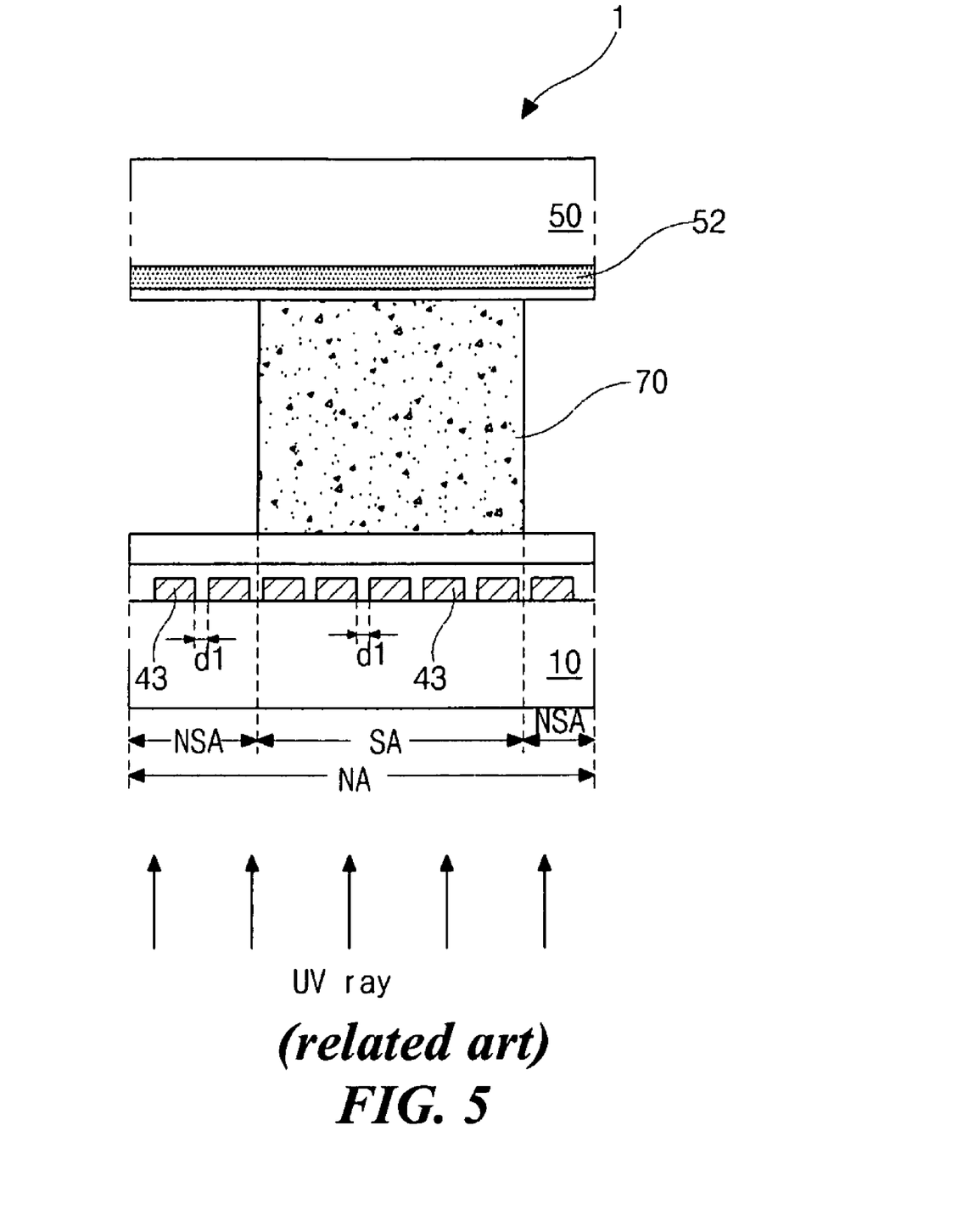
FIG. 5 is a cross-sectional view taken along a line V-V of FIG. 4.

FIG. 4 is a plan view showing a non-display area of a small-sized liquid crystal panel according to the related art, and FIG. 5 is a cross-sectional view taken along a line V-V of FIG. 4. For simplicity, the same reference numbers will be used to refer to the same parts in FIGS. 1, 4 and 5. In FIGS. 4 and 5, a small-sized liquid crystal panel 1 includes a display area (not shown) and a non-display area NA surrounding the display area. A plurality of gate pads (not shown) and a plurality of data pads (not shown) are formed in the non-display area NA at a single side of the small-sized liquid crystal panel 1. In addition, a plurality of driving lines including a plurality of gate link lines 43 and a plurality of data link lines (not shown) are formed the non-display area NA. Since the plurality of gate link lines 43 connect the plurality of gate pads and a plurality of gate lines and the plurality of data link lines (not shown) connect the plurality of data pads and a plurality of data lines, the number of the plurality of gate link lines 43 may correspond to the plurality of gate lines and the number of the plurality of data link lines may correspond to the plurality of data lines. As a result, the number of the plurality of driving lines increase as compared with a large-sized liquid crystal panel.

Since the number of the plurality of driving lines including the plurality of gate link lines 43 and the plurality of data link lines increase, a seal pattern 70 is formed in the non-display area NA to overlap a portion of the plurality of gate link lines 43. For example, the non-display area NA may be classified into a seal area SA where the seal pattern 70 and the portion of the plurality of gate link lines 43 are formed and a non-seal area NSA where the other portion of the plurality of gate link lines 43 are formed. In addition, a black matrix 52 is formed to completely cover the plurality of gate link lines 43 and the seal pattern 70.

Since the area proportion of the non-display area NA is limited in the small-sized liquid crystal panel 1, a distance d1 between adjacent two gate link lines 43 may be reduced as compared with a large-sized liquid crystal display panel. For example, when each gate link line 43 has a width of about 6 μm to about 10 μm, the adjacent two gate link lines 43 may be separated by the distance d1 of about 2 μm to about 4 μm. However, the adjacent two gate link lines 43 may be electrically shorted due to the short distance d1 therebetween. In addition, since an area proportion of the plurality of gate link lines 43 is greater than about 50% due to the short distance d1, the seal pattern 70 may be insufficiently cured with a UV ray through the plurality of gate link lines 43. The insufficiently cured seal pattern 70 may cause contamination of a liquid crystal layer in the seal pattern 70 or deterioration in attachment of first and second substrates 10 and 50 in a subsequent fabrication process.

SUMMARY

A liquid crystal display device includes: first and second substrates facing and spaced apart from each other, the first and second substrates having; first to fourth driving lines in the non-display area over the first substrate, the first and second driving lines horizontally separated by a first distance, and the third and fourth driving lines horizontally separated by a second distance greater than the first distance; a seal pattern of an ultraviolet curable material in the non-display area, the seal pattern overlapping the third and fourth driving lines; and a liquid crystal layer inside the seal pattern between the first and second substrates.

In another aspect, a liquid crystal display device includes: first and second substrates facing and spaced apart from each other, the first and second substrates having a display area displaying images and a non-display area surrounding the display area; a plurality of driving lines in the non-display area over the first substrate; a seal pattern of a ultraviolet curable material in the non-display area; and a liquid crystal layer inside the seal pattern between the first and second substrates, wherein a portion of the plurality of driving lines are exposed through the seal pattern and the other portion of the plurality of driving lines overlaps the seal pattern, and wherein adjacent two of the portion of the plurality of driving lines are horizontally separated by a first distance, and adjacent two of the other portion of the plurality of driving lines are horizontally separated by a second distance greater than the first distance.

In another aspect, a method of fabricating a liquid crystal display device includes: forming first to fourth driving lines in a non-display area over a first substrate, the non-display area surrounding a display area displaying images, the first and second driving lines horizontally separated by a first distance, and the third and fourth driving lines horizontally separated by a second distance greater than the first distance; forming a seal pattern of an ultraviolet curable material in the non-display area over one of the first substrate and a second substrate; forming a liquid crystal layer inside the seal pattern by dispensing liquid crystal materials; attaching the first and second substrates using the seal pattern, the seal pattern overlapping the third and fourth driving lines; and irradiating an ultraviolet ray onto the seal pattern through the third and fourth driving lines.

BRIEF DESCRIPTION OF THE DRAWINGS

The accompanying drawings, which are included to provide a further understanding of the invention and are incorporated in and constitute a part of this specification, illustrate embodiments of the invention.

DETAILED DESCRIPTION OF THE EMBODIMENTS

Reference will now be made in detail to embodiments which are illustrated in the accompanying drawings. Wherever possible, similar reference numbers will be used to refer to the same or similar parts.

Figure 6:
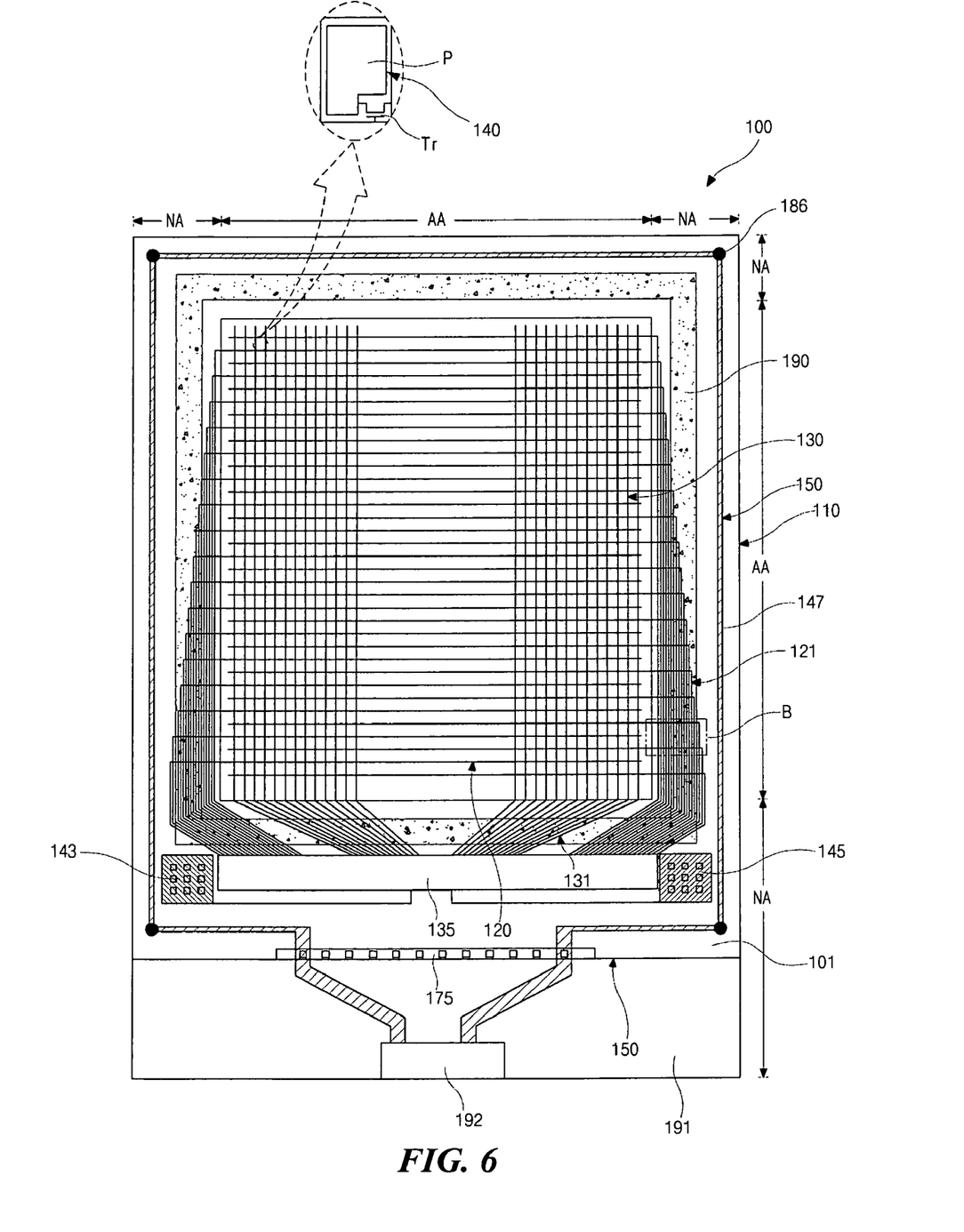
FIG. 6 is a plan view showing a liquid crystal display device according to an embodiment of the present invention.

FIG. 6 is a plan view showing a liquid crystal display device according to an embodiment of the present invention.

In FIG. 6, a liquid crystal display (LCD) device 100 has a display area AA displaying images and a non-display area NA surrounding the display area AA. The LCD device 100 includes a liquid crystal panel 101 and a flexible printed circuit (FPC) 191 as a connecting unit for a driving unit. The liquid crystal panel 101 includes first and second substrates 110 and 150 facing and spaced apart from each other and a liquid crystal layer (not shown) between the first and second substrates 110 and 150. A black matrix (not shown) is formed in the non-display area NA on an inner surface of the second substrate 150. In addition, a color filter layer (not shown) and a common electrode are sequentially formed in the display area AA on the inner surface of the second substrate 150.

A plurality of gate lines 120, a plurality of data lines 130, a plurality of thin film transistors (TFTs) Tr and a plurality of pixel electrodes 140 are formed in the display area AA on the first substrate 110 of the liquid crystal panel 101. The plurality of gate lines 120 and the plurality of data lines 130 cross each other to define a plurality of pixel regions P. In addition, the TFT Tr is connected to the gate line 120 and the data line 130, and the pixel electrode 140 is connected to the TFT Tr in each pixel region P. Although not shown in FIG. 6, the TFT Tr includes a gate electrode, a gate insulating layer on the gate electrode, a semiconductor layer on the gate insulating layer over the gate electrode, and source and drain electrodes on the semiconductor layer. The semiconductor layer includes an active layer of intrinsic silicon and an ohmic contact layer of impurity-doped silicon layer, and the source and drain electrodes are spaced apart from each other. Further, a passivation layer (not shown) having a drain contact hole (not shown) is formed on the source and drain electrodes, and the pixel electrode 140 is formed on the passivation layer. The drain contact hole exposes the drain electrode, and the pixel electrode 140 is connected to the drain electrode through the drain contact hole.

A plurality of gate pads (not shown) and a plurality of data pads (not shown) are formed in the non-display area NA on the first substrate 110 to correspond to a single side portion of the first substrate 110. In addition, a plurality of gate link lines 121 and a plurality of data link lines 131 are formed in the non-display area NA on the first substrate 110 to correspond to a boundary portion surrounding the display area AA. Although not shown in FIG. 6, the plurality of gate link lines 121 are spaced apart from each other by one of first ands second distances. The plurality of gate pads are connected to the plurality of gate lines 120 through the plurality of gate link lines 121, and the plurality of data pads are connected to the plurality of data lines 130 through the plurality of data link lines 131. A driving integrated circuit (IC) 135 is formed to contact the plurality of gate pads and the plurality of data pads. Accordingly, a gate signal is supplied to the plurality of gate lines 120 through the plurality of gate pads and the plurality of gate link lines 121, and a data signal of the driving IC 135 is supplied to the plurality of data lines 130 through the plurality of data pads and the plurality of data link lines 131.

Moreover, first and second test pads 143 and 145 are formed in the non-display area NA on the first substrate 110 to correspond to both sides of the driving IC 135. The first and second test pads 143 and 145 may be used for testing a voltage and a waveform of the gate signal and the data signal. A plurality of connection pads 175 are formed in the non-display area NA on the first substrate 110 to correspond to an edge portion of the first substrate 110. The FPC 191 including a connector 192 is connected to the plurality of connection pads 175. The FPC 191 is connected to a driving unit (not shown) including a printed circuit board (PCB) through the connector 192. As a result, the liquid crystal panel 101 is connected to the driving unit through the FPC 191.

Furthermore, conductive dots 186 are formed in the non-display area NA to correspond to four edge portions of the second substrate 150, and a common voltage line 147 is formed in the non-display area NA to connect the conductive dots 186. For example, the conductive dots 186 may include silver (Ag). The conductive dots 186 contact the first and second substrates 110 and 150, and a common voltage of the driving unit may be applied to the common electrode of the second substrate 150 through the conductive dots 186. A seal pattern 190 of UV curable material is formed in the non-display area NA between the first and second substrates 110 and 150. The seal pattern 190 may have a rectangular ring shape without an opening. A liquid crystal layer (not shown) is formed inside the seal pattern 190 between the first and second substrates 110 and 150.

In the LCD device 100, the data signal is applied to the pixel electrode 140 through the driving IC 135 and the TFT Tr and the common voltage is applied to the common electrode. An electric field is generated due to the voltage difference between the common electrode and the pixel electrode 140 and liquid crystal molecules are re-aligned along the electric field. As a result, transmittance of the liquid crystal layer is changed and the LCD device displays images.

Figure 7:
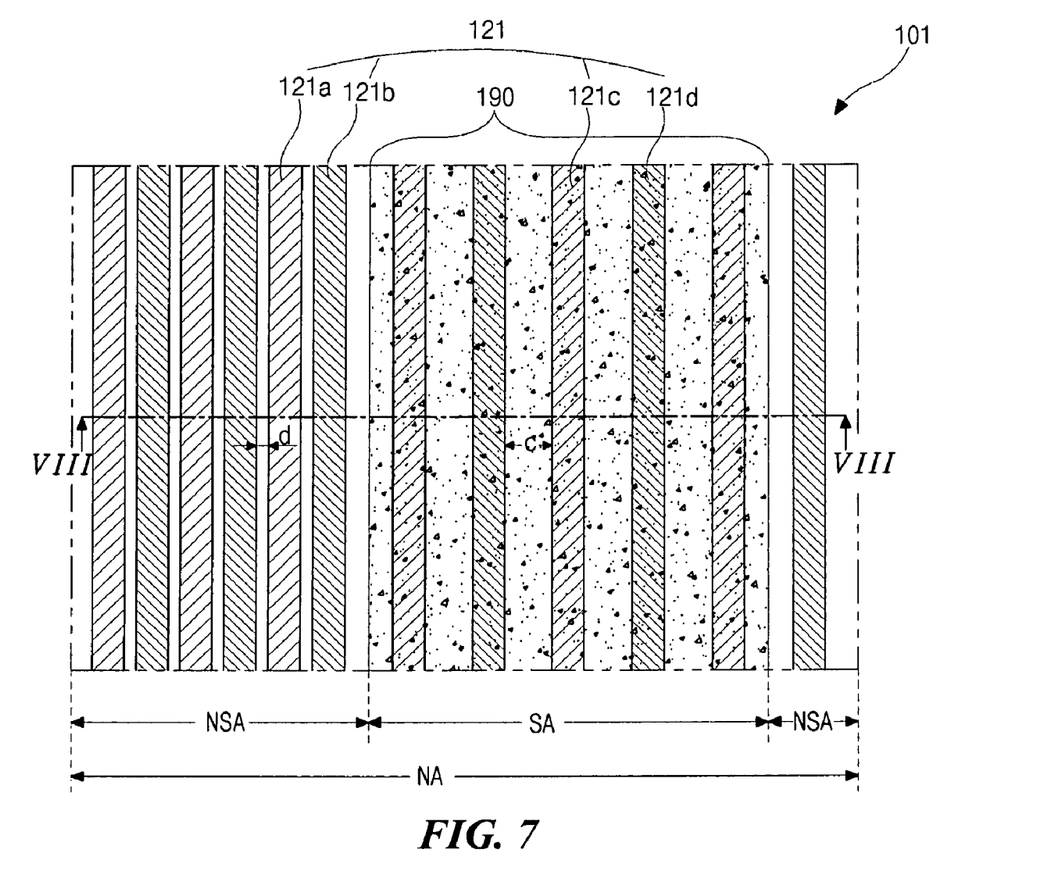
FIG. 7 is a magnified view showing a portion B of FIG. 6.
Figure 8:
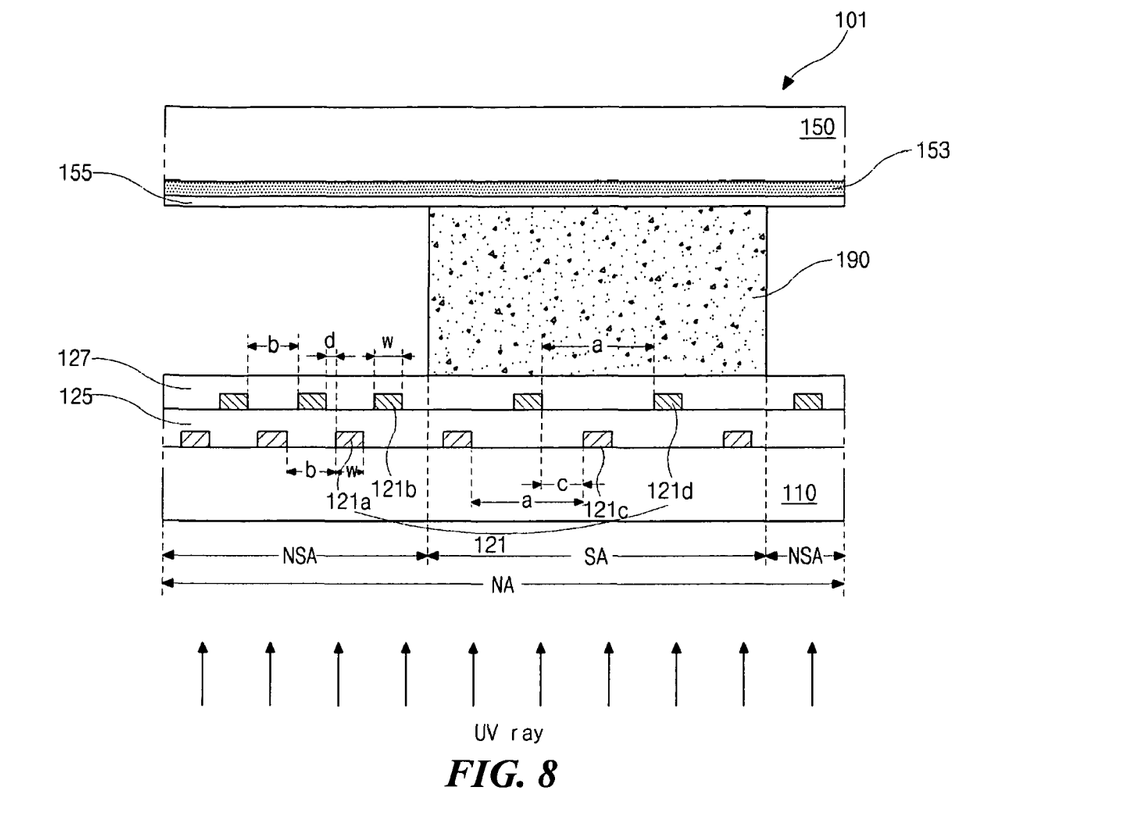
FIG. 8 is a cross-sectional view taken along a line VIII-VIII of FIG. 7.

FIG. 7 is a magnified view showing a portion B of FIG. 6, and FIG. 8 is a cross-sectional view taken along a line VIII-VIII of FIG. 7.

In FIGS. 7 and 8, a first substrate 110 of a liquid crystal panel 101 includes a non-display area NA, and a second substrate 150 of the liquid crystal panel 101 faces and is spaced apart from the first substrate 110. A plurality of driving lines including a plurality of gate link lines 121 and a plurality of data link lines are formed in the non-display area NA on the first substrate 110. For example, the plurality of gate link lines 121 may include first to fourth gate link lines 121a to 121d. The plurality of driving lines may be classified into a plurality of first driving lines and a plurality of second driving lines according to vertical location with respect to a first insulating layer 125. Accordingly, the plurality of first driving lines are formed on the first substrate 110, and a first insulating layer 125 is formed on the plurality of first driving lines. The plurality of second driving lines are formed on the first insulating layer 125 and a second insulating layer 127 is formed on the plurality of second driving lines. The first and second insulating layers 125 and 127 may include one of inorganic and organic insulating materials. The plurality of first driving lines alternate with the plurality of second driving lines. For example, the plurality of first driving lines include the first and third gate link lines 121a and 121c, and the plurality of second driving lines include the second and fourth gate link lines 121b and 121d. The first and third gate link lines 121a and 121c are formed on the first substrate 110, and the first insulating layer 125 is formed on the first and third gate link lines 121a and 121c. The second and fourth gate link lines 121b and 121d are formed on the first insulating layer 125, and the second insulating layer 127 is formed on the second and fourth gate link lines 121b and 121d.

In addition, a black matrix 153 and a common electrode 155 are sequentially formed on the second substrate 150. A seal pattern 190 is formed in the non-display area NA between the second insulating layer 127 of the first substrate 110 and the common electrode 155 of the second substrate 150. After the first and second substrates 110 and 150 are attached using the seal pattern 190, a UV ray is irradiated onto the seal pattern 190 through the first substrate 110. The non-display area NA may be classified into a seal area SA where the seal pattern 190 and a portion of the plurality of driving lines are formed and a non-seal area NSA where the other portion of the plurality of driving lines are formed without the seal pattern 190. For example, the first and second gate link lines 121a and 121b are formed in the non-seal area NSA, and the third and fourth gate link lines 121c and 121d are formed in the seal area SA. Each of the plurality of driving lines may have a width "w."

Each pair of the adjacent two first driving lines and the adjacent two second driving lines are horizontally separated by a first distance "a" in the seal area SA, and each pair of the adjacent two first driving lines and the adjacent two second driving lines are horizontally separated by a second distance "b" in the non-seal area NSA. In addition, the adjacent two first and second driving lines are horizontally separated by a third distance "c" in the seal area SA and the adjacent two first and second driving lines are horizontally separated by a fourth distance "d" in the non-seal area NSA. For example, the first and second gate link lines 121a and 121b in the non-seal area NSA are horizontally separated by the fourth distance "d," and the third and fourth gate link lines 121c and 121d in the seal area SA are horizontally separated by the third distance "c." The first distance "a" in the seal area SA is greater than the second distance "b" in the non-seal area NSA (a>b). For example, the first distance "a" in the seal area SA may be equal to or greater than three times of the width "w" of each driving line (a≧3w), and the second distance "b" in the non-seal area NSA may be within a range of about 3 μm to about 4 μm such that the electrical shortage is prevented between the two adjacent first driving lines or between the two adjacent second driving lines. In addition, the third distance "c" in the seal area SA is greater than the fourth distance "d" in the non-seal area NSA (c>d). For example, the third distance "c" in the seal area SA may be equal to or greater than the width "w" of each driving line (c≧w). When the width "w" of each gate link line 121 is within a range of about 6 μm to about 10 μm, the third distance "c" between the third and fourth gate link lines 121c and 121d in the seal area SA may be within a range of about 6 μm to about 10 μm. As a result, an area proportion of the plurality of driving lines in the seal area SA is smaller than about 50% and the seal 190 is sufficiently uniformly cured by the UV ray through the plurality of driving lines in the seal area SA.

In the non-seal area NSA, the plurality of driving lines are not required to transmit the UV ray and the fourth distance "d" between the adjacent two first and second driving lines is minimized. For example, the fourth distance "d" between the first and second gate link lines 121a and 121b may be smaller than the third distance "c" between the third and fourth gate link lines 121c and 121d. Alternatively, when the second distance "b" between the adjacent two first driving lines or between the adjacent two second driving lines is equal to the width "w" of each driving line (b=w), the fourth distance "d" between the first and second gate link lines 121a and 121b may be zero (d=0). Further, when the second distance "b" between the adjacent two first driving lines or between the adjacent two second driving lines is smaller than the width "w" of each driving line (b<w), the first and second gate link lines 121a and 121b may be formed to overlap each other.

The first and third gate link lines 121a and 121c may have the same layer as the plurality of gate lines 120, and the second and fourth gate link lines 121b and 121c may have the same layer as the plurality of data lines 130. In addition, the first insulating layer 125 may have the same layer as the gate insulating layer and the second insulating layer 125 may have the same layer as the passivation layer. The second and fourth gate link lines 121b and 121d may be connected to the plurality of gate lines 120 through a plurality of link contact holes (not shown) in the first insulating layer 125.

In the LCD device of FIGS. 6 to 8, the plurality of driving lines are classified into the plurality of first driving lines under the first gate insulating layer 125 and the plurality of second driving lines on the first insulating layer 125. Since the plurality of first driving lines have different layer from the plurality of second driving lines, the distance between the adjacent first and second driving lines in the non-seal area NSA is minimized. As a result, the non-display area NA is minimized and the display area AA is maximized. Further, since the distance between the adjacent first and second driving lines in the seal area SA is equal to or greater than the width of each driving line, the area proportion of the plurality of first and second driving lines in the seal area SA is smaller than about 50%. Accordingly, the seal pattern 190 is sufficiently uniformly cured by the UV ray through the plurality of first and second driving lines.

Although the plurality of driving lines in the seal area SA have different layers in FIGS. 7 and 8, the plurality of driving lines in the seal area SA may have the same layer in another embodiment.

Figure 9:
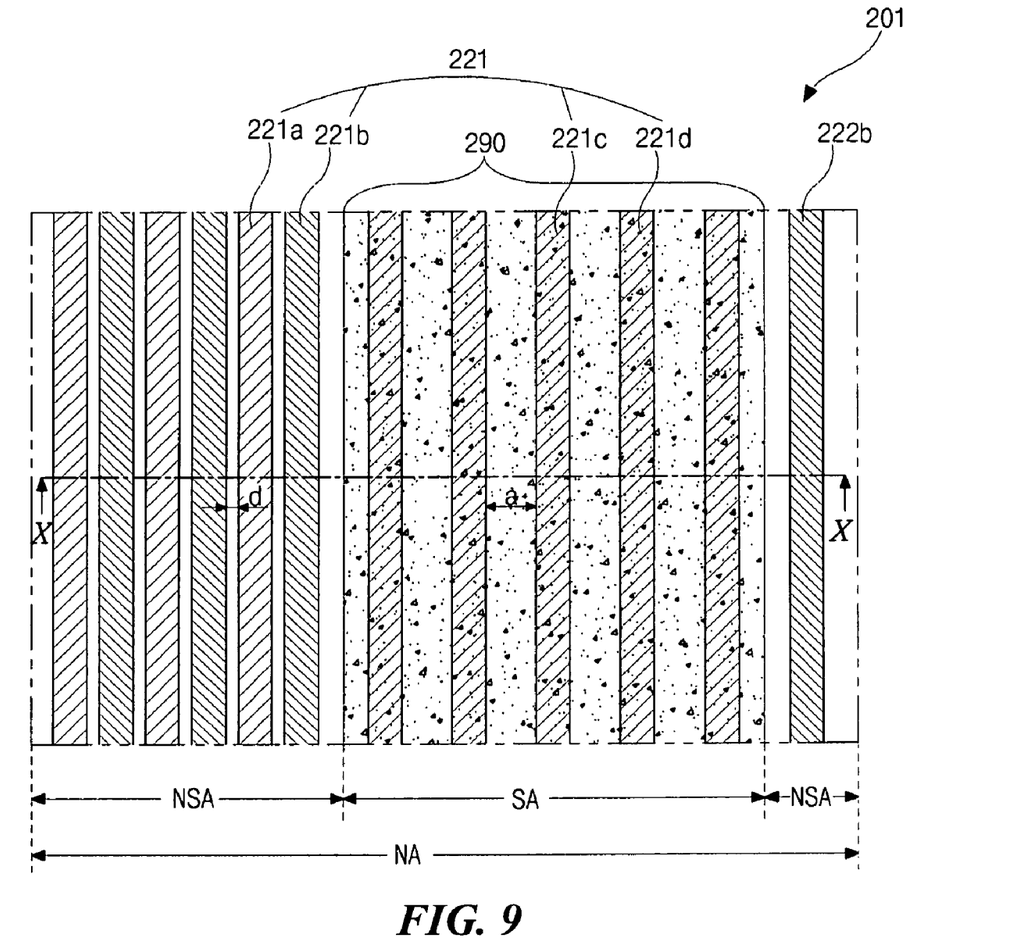
FIG. 9 is a plan view showing a non-display area of liquid crystal display device according to another embodiment of the present invention.
Figure 10:
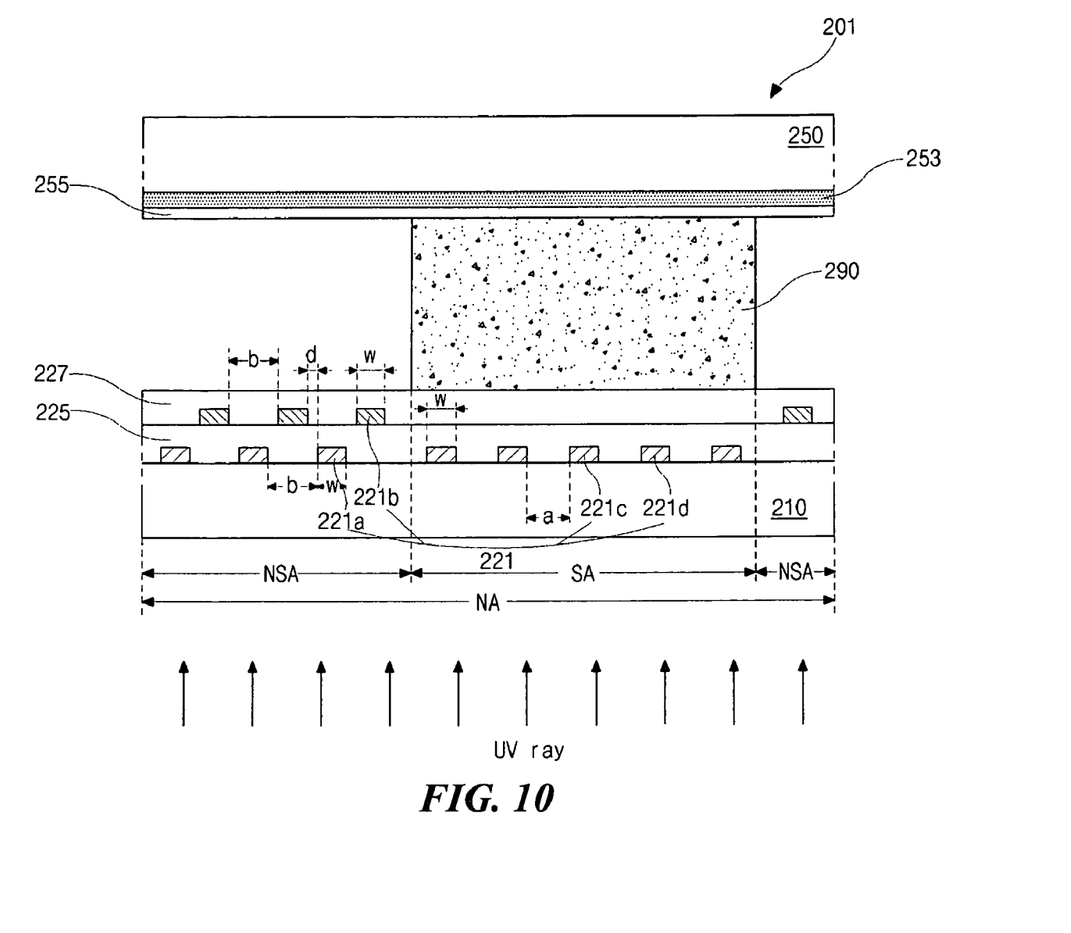
FIG. 10 is a cross-sectional view taken along a line X-X of FIG. 9.

FIG. 9 is a plan view showing a non-display area of liquid crystal display device according to another embodiment of the present invention, and FIG. 10 is a cross-sectional view taken along a line X-X of FIG. 9.

In FIGS. 9 and 10, a first substrate 210 of a liquid crystal panel 201 includes a non-display area NA, and a second substrate 250 of the liquid crystal panel 201 faces and is spaced apart from the first substrate 210. A plurality of driving lines including a plurality of gate link lines 221 and a plurality of data link lines are formed in the non-display area NA on the first substrate 210. For example, the plurality of gate link lines 221 may include first to fourth gate link lines 221a to 221d. The plurality of driving lines may be classified into a plurality of first driving lines and a plurality of second driving lines according to vertical location with respect to a first insulating layer 225. Accordingly, the plurality of first driving lines are formed on the first substrate 210, and a first insulating layer 225 is formed on the plurality of first driving lines. The plurality of second driving lines are formed on the first insulating layer 225 and a second insulating layer 227 is formed on the plurality of second driving lines. The first and second insulating layers 225 and 227 may include one of inorganic and organic insulating materials. The plurality of first driving lines alternate with the plurality of second driving lines. For example, the plurality of first driving lines include the first, third and fourth gate link lines 221a, 221c and 221d, and the plurality of second driving lines include the second gate link line 221b. The first, third and fourth gate link lines 221a, 221c and 221d are formed on the first substrate 210, and the first insulating layer 225 is formed on the first, third and fourth gate link lines 221a, 221c and 221d. The second gate link line 221b is formed on the first insulating layer 225, and the second insulating layer 227 is formed on the second gate link line 221b.

In addition, a black matrix 253 and a common electrode 255 are sequentially formed on the second substrate 250. A seal pattern 290 is formed in the non-display area NA between the second insulating layer 227 of the first substrate 210 and the common electrode 255 of the second substrate 250. After the first and second substrates 210 and 250 are attached using the seal pattern 290, a UV ray is irradiated onto the seal pattern 290 through the first substrate 210. The non-display area NA may be classified into a seal area SA where the seal pattern 290 and a portion of the plurality of driving lines are formed and a non-seal area NSA where the other portion of the plurality of driving lines are formed without the seal pattern 290. For example, the first and second gate link lines 221a and 221b are formed in the non-seal area NSA, and the third and fourth gate link lines 221c and 221d are formed in the seal area SA. Each of the plurality of driving lines may have a width "w."

The plurality of driving lines in the seal area SA include the plurality of first driving lines having the same layer under the first insulating layer 225. For example, the third and fourth gate link lines 221c and 221d are formed on the first substrate 210 and the first insulating layer 225 is formed on the third and fourth gate link lines 221c and 221d. In addition, the second insulating layer 227 is formed on the first insulating layer 225 without the plurality of gate link lines in the seal area SA. The adjacent two first driving lines are horizontally separated by a first distance "a" in the seal area SA, and each pair of the adjacent two first driving lines and the adjacent two second driving lines are horizontally separated by a second distance "b" in the non-seal area NSA. Since only the plurality of first driving lines are formed in the seal area SA, the first distance "a" of FIGS. 9 and 10 corresponds to the third distance "c" of FIGS. 7 and 8. In addition, the adjacent two first and second driving lines are horizontally separated by a fourth distance "d" in the non-seal area NSA. For example, the first and second gate link lines 221a and 221b in the non-seal area NSA are horizontally separated by the fourth distance "d," and the third and fourth gate link lines 221c and 221d in the seal area SA are horizontally separated by the first distance "a." The first distance "a" in the seal area SA may be greater than the second distance "b" in the non-seal area NSA (a>b). For example, the second distance "b" in the non-seal area NSA may be within a range of about 3 μm to about 4 μm such that the electrical shortage is prevented between the two adjacent first driving lines or between the two adjacent second driving lines. In addition, the first distance "a" in the seal area SA is greater than the fourth distance "d" in the non-seal area NSA (a>d). For example, the first distance "a" in the seal area SA may be equal to or greater than the width "w" of each driving line (a≧w). When the width "w" of each gate link line 221 is within a range of about 6 μm to about 10 μm, the first distance "a" between the third and fourth gate link lines 221c and 221d in the seal area SA may be within a range of about 6 μm to about 10 μm. As a result, an area proportion of the plurality of driving lines in the seal area SA is smaller than about 50% and the seal 290 is sufficiently uniformly cured by the UV ray through the plurality of driving lines in the seal area SA.

In the non-seal area NSA, the plurality of driving lines are not required to transmit the UV ray and the fourth distance "d" between the adjacent two first and second driving lines is minimized. For example, the fourth distance "d" between the first and second gate link lines 221a and 221b may be smaller than the first distance "a" between the third and fourth gate link lines 221c and 221d (d<a). Alternatively, when the second distance "b" between the adjacent two first driving lines or between the adjacent two second driving lines is equal to the width "w" of each driving line (b=w), the fourth distance "d" between the first and second gate link lines 221a and 221b may be zero (d=0). Further, when the second distance "b" between the adjacent two first driving lines or between the adjacent two second driving lines is smaller than the width "w" of each driving line (b<w), the first and second gate link lines 221a and 221b may be formed to overlap each other.

The first, third and fourth gate link lines 221a, 221c and 221d may have the same layer as a plurality of gate lines (not shown), and the second gate link line 221b may have the same layer as a plurality of data lines (not shown). In addition, the first insulating layer 225 may have the same layer as a gate insulating layer (not shown) of a TFT (not shown) and the second insulating layer 225 may have the same layer as a passivation layer (not shown) on the TFT. The second gate link line 221b may be connected to the plurality of gate lines through a plurality of link contact holes (not shown) in the first insulating layer 225.

In the LCD device of FIGS. 9 and 10, the plurality of driving lines are classified into the plurality of first driving lines under the first gate insulating layer 225 and the plurality of second driving lines on the first insulating layer 225. Since the plurality of first driving lines have different layer from the plurality of second driving lines, the distance between the adjacent first and second driving lines in the non-seal area NSA is minimized. As a result, the non-display area NA is minimized and the display area AA is maximized. Further, the distance between the adjacent first driving lines in the seal area SA is equal to or greater than the width of each driving line, the area proportion of the plurality of first driving lines in the seal area SA is smaller than about 50%. Moreover, since the plurality of first driving lines in the seal area SA has the same layer, scattering at the plurality of first driving lines may be minimized while a UV ray passes through the plurality of first driving lines. Accordingly, the seal pattern 290 is sufficiently uniformly cured by the UV ray through the plurality of first driving lines.

Figure 11:
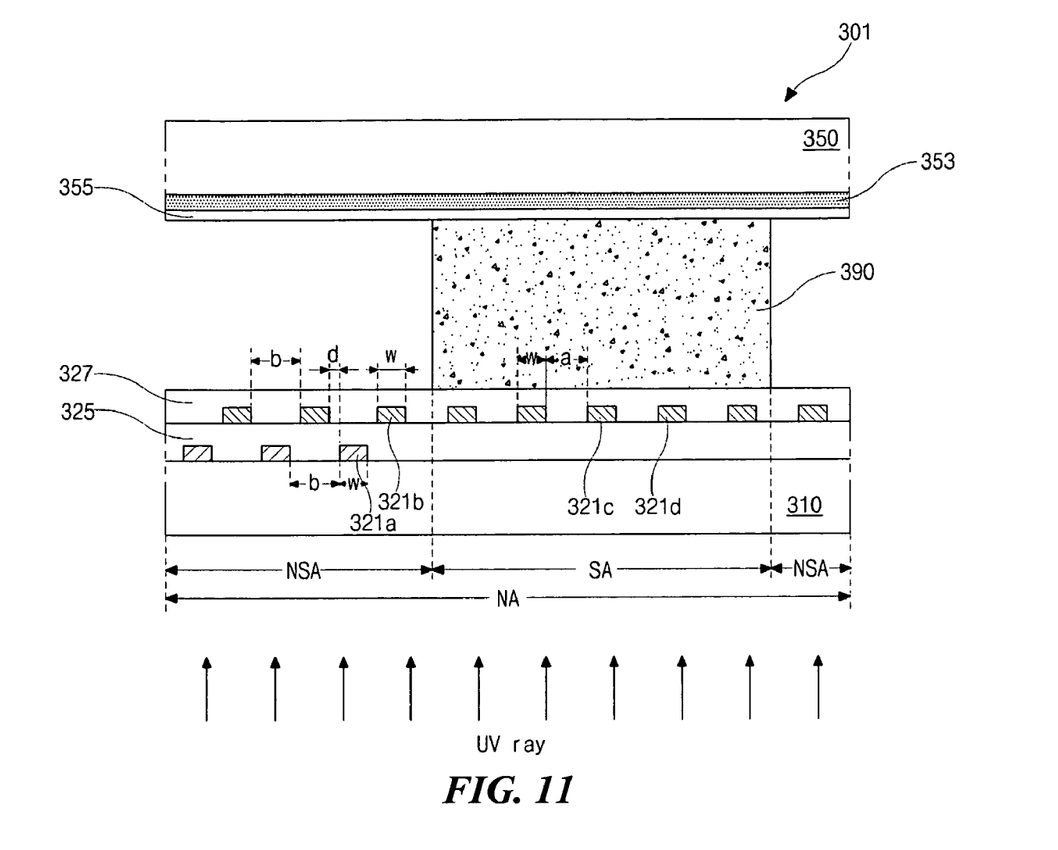
FIG. 11 is a cross-sectional view showing a non-display area of liquid crystal display device according to another embodiment of the present invention.

FIG. 11 is a cross-sectional view showing a non-display area of liquid crystal display device according to another embodiment of the present invention.

In FIG. 11, a first substrate 310 of a liquid crystal panel 301 includes a non-display area NA, and a second substrate 350 of the liquid crystal panel 301 faces and is spaced apart from the first substrate 310. A plurality of driving lines including a plurality of gate link lines 321 and a plurality of data link lines are formed in the non-display area NA on the first substrate 310. For example, the plurality of gate link lines 321 may include first to fourth gate link lines 321a to 321d. The plurality of driving lines may be classified into a plurality of first driving lines and a plurality of second driving lines according to vertical location with respect to a first insulating layer 325. Accordingly, the plurality of first driving lines are formed on the first substrate 310, and a first insulating layer 325 is formed on the plurality of first driving lines. The plurality of second driving lines are formed on the first insulating layer 325 and a second insulating layer 327 is formed on the plurality of second driving lines. The first and second insulating layers 325 and 327 may include one of inorganic and organic insulating materials. The plurality of first driving lines alternate with the plurality of second driving lines. For example, the plurality of first driving lines include the first gate link line 321a, and the plurality of second driving lines include the second, third and fourth gate link lines 321b, 321c and 321d. The first gate link line 321a is formed on the first substrate 310, and the first insulating layer 325 is formed on the first gate link line 321a. The second, third and fourth gate link lines 321b, 321c and 321d are formed on the first insulating layer 325, and the second insulating layer 327 is formed on the second, third and fourth gate link lines 321b, 321c and 321d.

In addition, a black matrix 353 and a common electrode 355 are sequentially formed on the second substrate 350. A seal pattern 390 is formed in the non-display area NA between the second insulating layer 327 of the first substrate 310 and the common electrode 355 of the second substrate 350. After the first and second substrates 310 and 350 are attached using the seal pattern 390, a UV ray is irradiated onto the seal pattern 390 through the first substrate 310. The non-display area NA may be classified into a seal area SA where the seal pattern 390 and a portion of the plurality of driving lines are formed and a non-seal area NSA where the other portion of the plurality of driving lines are formed without the seal pattern 390. For example, the first gate link line 321a is formed in the non-seal area NSA, and the second, third and fourth gate link lines 321b, 321c and 321d are formed in the seal area SA. Each of the plurality of driving lines may have a width "w."

The plurality of driving lines in the seal area SA include the plurality of second driving lines having the same layer on the first insulating layer 325. For example, the first insulating layer 325 is formed on the first substrate 310 without the plurality of gate link lines in the seal area SA. In addition, the third and fourth gate link lines 321c and 321d are formed on the first insulating layer 325 and the second insulating layer 327 is formed on the third and fourth gate link lines 321c and 321d. The adjacent two second driving lines are horizontally separated by a first distance "a" in the seal area SA, and each pair of the adjacent two first driving lines and the adjacent two second driving lines are horizontally separated by a second distance "b" in the non-seal area NSA. Since only the plurality of second driving lines are formed in the seal area SA, the first distance "a" of FIG. 11 corresponds to the third distance "c" of FIGS. 7 and 8. In addition, the adjacent two first and second driving lines are horizontally separated by a fourth distance "d" in the non-seal area NSA. For example, the first and second gate link lines 321a and 321b in the non-seal area NSA are horizontally separated by the fourth distance "d," and the third and fourth gate link lines 321c and 321d in the seal area SA are horizontally separated by the first distance "a." The first distance "a" in the seal area SA may be greater than the second distance "b" in the non-seal area NSA (a>b). For example, the second distance "b" in the non-seal area NSA may be within a range of about 3 μm to about 4 μm such that the electrical shortage is prevented between the two adjacent first driving lines or between the two adjacent second driving lines. In addition, the first distance "a" in the seal area SA is greater than the fourth distance "d" in the non-seal area NSA (a>d). For example, the first distance "a" in the seal area SA may be equal to or greater than the width "w" of each driving line (a≧w). When the width "w" of each gate link line 221 is within a range of about 6 μm to about 10 μm, the first distance "a" between the third and fourth gate link lines 321c and 321d in the seal area SA may be within a range of about 6 μm to about 10 μm. As a result, an area proportion of the plurality of driving lines in the seal area SA is smaller than about 50% and the seal 390 is sufficiently uniformly cured by the UV ray through the plurality of driving lines in the seal area SA.

In the non-seal area NSA, the plurality of driving lines are not required to transmit the UV ray and the fourth distance "d" between the adjacent two first and second driving lines is minimized. For example, the fourth distance "d" between the first and second gate link lines 321a and 321b may be smaller than the first distance "a" between the third and fourth gate link lines 321c and 321d (d<a). Alternatively, when the second distance "b" between the adjacent two first driving lines or between the adjacent two second driving lines is equal to the width "w" of each driving line (b=w), the fourth distance "d" between the first and second gate link lines 321a and 321b may be zero (d=0). Further, when the second distance "b" between the adjacent two first driving lines or between the adjacent two second driving lines is smaller than the width "w" of each driving line (b<w), the first and second gate link lines 321a and 321b may be formed to overlap each other.

The first gate link line 321a may have the same layer as a plurality of gate lines (not shown), and the second, third and fourth gate link lines 321b, 321c and 321d may have the same layer as a plurality of data lines (not shown). In addition, the first insulating layer 325 may have the same layer as a gate insulating layer (not shown) of a TFT (not shown) and the second insulating layer 325 may have the same layer as a passivation layer (not shown) on the TFT. The second, third and fourth gate link lines 321b, 321c and 321d may be connected to the plurality of gate lines through a plurality of link contact holes (not shown) in the first insulating layer 325.

In the LCD device of FIG. 11, the plurality of driving lines are classified into the plurality of first driving lines under the first gate insulating layer 325 and the plurality of second driving lines on the first insulating layer 325. Since the plurality of first driving lines have different layer from the plurality of second driving lines, the distance between the adjacent first and second driving lines in the non-seal area NSA is minimized. As a result, the non-display area NA is minimized and the display area AA is maximized. Further, the distance between the adjacent second driving lines in the seal area SA is equal to or greater than the width of each driving line, the area proportion of the plurality of second driving lines in the seal area SA is smaller than about 50%. Moreover, since the plurality of second driving lines in the seal area SA has the same layer, scattering at the plurality of second driving lines may be minimized while a UV ray passes through the plurality of second driving lines. Accordingly, the seal pattern 390 is sufficiently uniformly cured by the UV ray through the plurality of second driving lines.

In an LCD device according to the present invention, a plurality of driving lines formed in a non-display area are classified into a plurality of first driving lines and a plurality of second driving lines. Since the plurality of first driving lines have different layer from the plurality of second driving lines with an intervening insulating layer, a distance between the adjacent driving lines in a non-seal area is minimized. Accordingly, the non-display area is minimized and a display area is maximized. In addition, since a distance between the adjacent driving lines in a seal area is equal to or greater than a width of each driving line, a seal pattern is sufficiently uniformly cured by a UV ray through the plurality of driving lines in the seal area. Accordingly, contamination of a liquid crystal layer and deterioration in attachment step are prevented. As a result, since a sequential dispensing and attaching method is applicable for a liquid crystal layer of the LCD device, process time is reduced and efficiency in fabrication process is improved.

It will be apparent to those skilled in the art that various modifications and variations can be made in a liquid crystal display device and a method of fabricating the liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates facing and spaced apart from each other, the first and second substrates having;
   first to fourth driving lines in the non-display area over the first substrate;
   a first insulating layer between the first and second driving lines;
   a second insulating layer on the second driving line;
   a seal pattern of an ultraviolet curable material in the non-display area; and
   a liquid crystal layer inside the seal pattern between the first and second substrates,
   wherein the first and second driving lines are exposed outside the seal pattern and are horizontally separated by a first distance,
   wherein the third and fourth driving lines overlap the seal pattern and are horizontally separated by a second distance greater than the first distance, and
   wherein the first to fourth driving lines have a same width as one another.

2. The device according to claim 1, wherein the first insulating layer is formed on the third driving line, and the fourth driving line is formed between the first and second insulating layers.

3. The device according to claim 1, wherein the first insulating layer is formed on the third and fourth driving lines.

4. The device according to claim 1, wherein the third and fourth driving lines are formed between the first and second insulating layers.

5. The device according to claim 1, wherein the second distance is equal to or greater than a width of each of the first to fourth driving lines.

6. The device according to claim 5, wherein the width of each of the first to fourth driving lines is within a range of about 6 μm to about 10 μm.

7. The device according to claim 1, further comprising:
   a gate line, a data line, a thin film transistor and a pixel electrode in the display area on the first substrate, wherein the gate line crosses the data line, wherein the thin film transistor is connected to the gate line and the data line, and wherein the pixel electrode is connected to the thin film transistor; and
   a color filter layer, a black matrix and a common electrode in the display area on the second substrate, wherein the black matrix corresponds to the seal pattern.

8. The device according to claim 7, wherein at least one of the first to fourth driving lines is one of a gate link line connected to the gate line and a data link line connected to the data line.

9. The device according to claim 7, wherein a gate insulating layer is formed on the gate line and a passivation layer is formed on the data line, wherein the first and second driving lines have the same layer as the gate line and the data line, respectively, and wherein the first insulating layer and the second insulating layer have the same layer as the gate insulating layer and the passivation layer, respectively.

10. A liquid crystal display device, comprising:
    first and second substrates facing and spaced apart from each other, the first and second substrates having a display area displaying images and a non-display area surrounding the display area;
    a plurality of driving lines in the non-display area over the first substrate;
    a seal pattern of a ultraviolet curable material in the non-display area;
    first and second insulating layers between the first substrate and the seal pattern; and
    a liquid crystal layer inside the seal pattern between the first and second substrates,
    wherein a first portion of the plurality of driving lines are exposed outside the seal pattern and a second portion of the plurality of driving lines overlaps the seal pattern,
    wherein adjacent two of the first portion of the plurality of driving lines are horizontally separated by a first distance, and adjacent two of the second portion of the plurality of driving lines are horizontally separated by a second distance greater than the first distance,
    wherein the first portion of the plurality of driving lines include a plurality of first driving lines and a plurality of second driving lines alternating with one another
    wherein the first insulating layer is formed between the plurality of first driving lines and the plurality of second driving lines, and the second insulating layer is formed on the plurality of second driving lines, and
    wherein the first portion of the plurality of driving lines have a same width as the second portion of the plurality of driving lines.

11. The device according to claim 10, wherein the second portion of the plurality of driving lines include the plurality of the first driving lines under the first insulating layer and the plurality of second driving lines between the first and second insulating layers.

12. The device according to claim 10, wherein the second portion of the plurality of driving lines exclusively include the plurality of the first driving lines under the first insulating layer.

13. The device according to claim 10, wherein the second portion of the plurality of driving lines exclusively include the plurality of second driving lines between the first and second insulating layers.

14. The device according to claim 10, wherein the second distance is equal to or greater than a width of each of the plurality of driving lines.

15. A method of fabricating a liquid crystal display device, comprising:

forming first to fourth driving lines in a non-display area over a first substrate, the non-display area surrounding a display area displaying images;

forming a first insulating layer between the first and second driving lines;

forming a second insulating layer on the second driving line;

forming a seal pattern of an ultraviolet curable material in the non-display area over one of the first substrate and a second substrate;

forming a liquid crystal layer inside the seal pattern by dispensing liquid crystal materials;

attaching the first and second substrates using the seal pattern, the seal pattern overlapping the third and fourth driving lines; and     irradiating an ultraviolet ray onto the seal pattern through the third and fourth driving lines,     wherein the first and second driving lines are exposed outside the seal pattern and are horizontally separated by a first distance,     wherein the third and fourth driving lines overlap the seal pattern and are horizontally separated by a second distance greater than the first distance, and     wherein the first to fourth driving lines have a same width as one another.

\* \* \* \* \*